TELEVISION RECEIVER
Original Filed Dec. 7, 1961
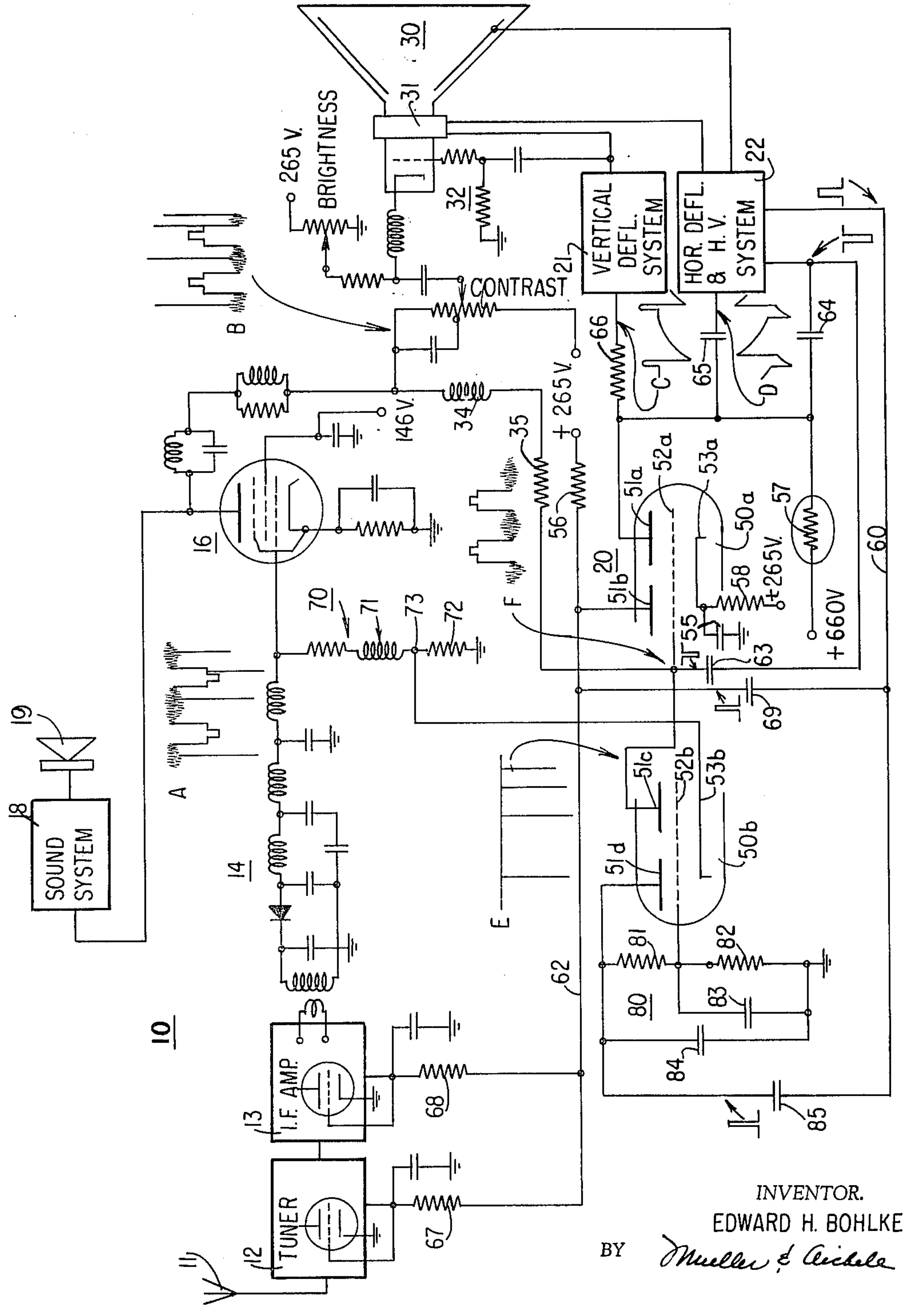
INVENTOR.
EDWARD H. BOHLKE
BY Mueller & Aichele
ATTYS.

United States Patent Office 3,247,318
Patented Apr. 19, 1966

3,247,318
TELEVISION RECEIVER
Edward H. Bohlke, Elmwood Park, Ill., assignor to Motorola, Inc., Chicago, Ill., a corporation of Illinois
Continuation of application Ser. No. 157,706, Dec. 7, 1961. This application Apr. 8, 1965, Ser. No. 449,368
7 Claims. (Cl. 178—7.3)

This invention relates in general to television receiver synchronizing circuits and in particular to such a synchronizing signal separator circuit which has improved immunity to pulse noise disturbances and changes in the signal level strength of received television signals. This application is a continuation of my application Serial No. 157,706, filed December 7, 1961.

Modern day television reception is effected by the transmission of composite video signals having video frequency components and synchronizing pulse components of an amplitude greater than the maximum video-signal amplitude. Circuitry is provided in the television receiver to separate the synchronizing signal components from the received video signal components with the separated sync pulses being subsequently utilized in line and field deflection systems to synchronize the scanning of an image reproducing device with that of the transmitter. It is well known that impulse noise disturbances accompanying the transmitted television signal can seriously impair the proper function of the synchronization and automatic gain control (AGC) circuits. The impulse noise disturbances are generally of very short time duration and much greater amplitude than the synchronizing pulse components. The disturbances occurring during video-signal or the sync-pulse interval can cause false or even complete loss of synchronization. Furthermore, such impulse noise can cause the AGC to respond falsely as though the noise were part of a desired signal.

Various methods have been employed to provide a certain degree of immunity to such impulse noise in synchronizing and automatic gain control circuits., One such method employs noise clipping in the video amplifier. Immunity to noise is thus obtained by maintaining the synchronizing pulses at a given level of amplitude and clipping all noise exceeding this level. Other systems obtain immunity to noise by incorporating a noise cancelling circuit whereby a portion of the impulse noise above the level of the sync pulses is amplified and inverted in a separate channel and used to cancel the noise in the sync region of the composite video signal. This method, however, requires a precise bias to be maintained such that only impulse noise above the sync pulses are so amplified in the noise inverter. In certain areas, such as rural communities, there may be strong signal reception from one television station but relatively weak signal reception from one or more other stations. If the bias in the noise inverter is set for the strong signal it will therefore be incorrect for the relatively weak signal and vice versa. It is obviously inconvenient for the user to reset the bias level when changing from station to station. Further, the noise in some instances may become so concentrated as to become indistinguishable from the sync signals, thereby permitting "set-up" on the noise and paralyzation of the synchronizing circuits. In general, all such prior systems require relatively complex circuitry.

It is an object of the present invention to provide an improved automatic gain control and sync separating circuit for a television receiver operating in a stable reliable manner and requiring simple, inexpensive circuit parameters.

Another object is to provide such an automatic gain control and sync separation circuit wherein the appropriate gain control and sync signals are developed and passed therethrough but which is relatively unresponsive to impulse noise disturbances and noise paralysis.

A further object is to provide such an automatic gain control and sync separating circuit having a noise cancellation circuit wherein the operation level is automatically varied in accordance with the level of strength of the received television signal.

A feature of the present invention is the provision of a television receiver which incorporates automatic gain control and sync separating circuits having a self-biased noise inverter circuit direct-current coupled between the output of the video detector and the common input to the automatic gain control and sync separating circuit for inverting noise pulses above the amplitude level of the sync components and utilized to cancel the impulse noise disturbances present in the applied composite video signal.

Another feature is the provision of an automatic gain control and sync separating circuit wherein a gated automatic level set control network is direct-current coupled to the noise inverter for applying thereto a derived bias proportional to strength level of the received television signal.

Still another feature is the provision in such an automatic gain control and sync separating circuit of a dual triode vacuum tube, each section having a common control grid, a common cathode and two separate anodes, thereby providing four distinct conduction paths within a single envelope. The sync separating circuit utilizes the first cathode grid and anode thereof; the automatic gain control circuit utilizes the first cathode and grid and the second anode thereof; the noise inverter utilizes the second grid and cathode and third anode thereof; and the automatic level set control circuit utilizes the second grid and cathode and the fourth anode thereof.

The drawing is a partial schematic and block diagram of a television receiver incorporating the invention.

In practicing the invention a combined automatic gain control and sync separating circuit is provided for a television receiver which includes a noise cancelling circuit and an automatic level set control circuit. A single dual triode vacuum tube is provided having four separate anodes, two common grids and two common cathodes wherein the automatic gain control circuit utilizes the first cathode, grid and anode, and the sync separating circuit utilizes the first cathode and grid common to the automatic gain control circuit and the second anode thereof. The noise inverter utilizes the second cathode and grid and the third anode with the automatic level set control circuit utilizing the second cathode and grid common to the noise inverter and the fourth anode thereof. Composite video signals are direct current coupled to the common first grid, acting as the input to the automatic gain control and sync separating circuit. Direct current coupling thereby permits the utilization of full direct current video information and higher AGC loop gain. The noise inverter is direct-current coupled between the output of the video detector and the input of the automatic gain control and sync separating circuit and provides amplified noise pulses above the peak level of sync components to cancel impulse noise disturbances in the composite video signal being applied from the video amplifier to the input of the automatic gain control and sync separating circuit. The automatic level set control is gated at the horizontal deflection frequency and determines the correct level of conduction of the noise inverter at all times by applying a bias derived in accordance with the signal level strength of the received television signal. Direct current coupling of the negative and positive polarity composite video signals to the noise inverter in cooperation with a variable derived bias voltage from the automatic level set circuit thereby provides noise cancellation regardless of the signal strengths of the received television signals without further manual adjustments, even in weak signals below the threshold of the usual receiver automatic gain control action where prior systems fail to function properly.

Referring to the drawing, a tuner 12 is coupled to an associated antenna 11 for selecting and converting a desired signal to an intermediate frequency which is applied to an amplified in an intermediate frequency amplifier 13. Amplifier 13 is coupled to a video detector 14 which demodulates a received composite video signal having line and frame synchronizing components, video frequency components and a modulated sound carrier. The demodulated signal is represented by waveform A. As indicated, the demodulated signal may be accompanied by large amplitude disturbance pulses superimposed thereon.

The demodulated television signal is applied to video amplifier 16 wherein the demodulated video signal appearing at the output is coupled to the cathode of image reproducing device 30. Video amplifier 16 also provides the sound subcarrier at its output which is coupled to the sound system 18 where the sound signal is detected, amplified and applied to loudspeaker 19 for aural reproduction.

The demodulated television signal is also applied through a direct current coupling circuit consisting of coil 34 and resistor 35 to the input of a combined gated automatic gain control and sync separating circuit 20. By direct current coupling of the composite video signals, the full direct current video information is thereby utilized which results in a higher AGC loop gain even though only triodes are used. Previous methods of alternating current coupling required the signal so applied to be severely divided down before application.

The automatic gain control circuit utilizes the common grid **52*a* and cathode 53*a* of vacuum tube section 50*a* and anode 51*b*. The synchronizing separator circuit utilizes grid 52*a*, cathode 53*a* and anode 51*a*. A direct current bias is supplied to grid 52*a* consisting of the difference between the direct current level at the output of the video amplifier 16 and the resistor 58 connected between cathode 53*a* and B+. Capacitor 55 provides the required bypass for resistor 58. The plate load for the automatic gain control circuit is provided by resistor 56 with the plate load for the sync separating circuit being provided by voltage dependent resistor 57. The automatic gain control circuit is gated by means of a positive pulse occurring at the line or horizontal deflection frequency applied thereto at anode 51*b* over lead 60 from the horizontal deflection circuit 22. A control potential is developed at anode 51*b* by the automatic gain control circuit and having a value dependent upon the strength of received signal and is direct current applied through lead 62 and resistors 67 and 68 to the respective control grids of the amplifying devices in tuner 12 and intermediate frequency amplifier 13 for the regulation of the gain thereof. As shown, a negative pulse occurring at the line or horizontal deflection frequency is applied to the grid of the automatic gain control circuit through coupling capacitor 63 and to the plate of the sync separating circuit through coupling capacitor 64 to neutralize the effect of a charge build-up which may occur by reason of the interelectrode capacitance in tube section 50*a* resulting from the applied positive pulse at anode 51*b***.

The sync separating circuit amplitude separates the applied demodulated video signal from video amplifier 16 into both frame and line synchronizing signal components by the RC network consisting of capacitor 65 and resistor 66 connected to anode **51*a*. The vertical sync component developed across resistor 66, as shown by waveform C, is applied to the vertical sweep system 21, which develops and applies a sawtooth wave current signal to the magnetic deflection yoke 31 on the cathode ray tube 30 for vertical scanning. The horizontal synchronizing component developed across capacitor 65, as shown by waveform D, is applied to the horizontal deflection system 22, which develops a suitable sawtooth scanning current in the magnetic deflection yoke 31 for horizontal deflection as well as providing the high voltage to the screen of cathode ray tube 30. Vertical blanking pulses are applied from the output of vertical deflection system 21 to the grid of the cathode ray tube 30 via network 32**.

The foregoing description is applicable to the operation of a television receiver in general terms. Since such operation is generally well known to those skilled in the art, further specific and detailed discussion is believed unnecessary. The following discussion and description concerns the provision of the present invention in minimizing the deleterious effects of impulse noise disturbances upon the automatic gain control and sync separating circuits.

As mentioned previously, impulse noise disturbances can seriously impair the proper operation of a television receiver particularly in the sync separator circuit. Heavy concentration of noise pulses which are superimposed upon the composite video signal may cause false or even complete loss of synchronization. To prevent this from occurring, a provision is made to cancel all such noise disturbances above the level of the sync tips in the composite video signal. The circuit includes a noise inverter tube to provide derived noise pulses of opposite polarity whereby the noise components appearing in the composite video signal are effectively cancelled at the output of the video amplifier.

The noise inverter utilizes second grid **52*b* and cathode 53*b* of tube section 50*b* and anode 51*c*. Composite video signals of negative polarity from the output of video detector 14 are direct current coupled to cathode 53*b* from junction 73 in video peaking circuit 70. Resistor 72 further serves as the cathode resistor for the noise inverter. Resistor 35 serves as the plate load. In operation, a bias is maintained at the control grid 52*b* whereby the noise inverter conducts at the maximum level of the sync tips and above. This provides an output consisting of negative-going noise pulses, as represented by waveform E. The negative polarity noise pulses thus cancel the noise components in the positive video signal applied to grid 52*a*** of the combined automatic gain control and sync separating circuit. The result is portrayed by waveform F.

It should be emphasized that the bias applied to the noise inverter should exceed the sync peak height by the smallest margin compatible with preventing conduction of the tube section on sync peaks. In the past, such bias was generally provided by a potentiometer and normally adjusted to a value corresponding to the highest signal level which could be expected at the video detector. This presented a problem however in those areas where strong signal reception was received from one station but relatively weak reception from one or more other stations. The bias adjustment would therefore be correct for the strong signal but incorrect for the weak signals. The same would be true if the bias adjustment were made with reference to the weaker signals whereby the bias value would be incorrect for the stronger level signals. The former condition results in incomplete noise cancellation with the latter resulting the paralyzation of the automatic gain control and sync separating circuits.

To overcome this disadvantage, the present invention provides automatic level setting for the noise inverter bias to accommodate the variations in the signal level strength of the received television signals. The automatic level setting circuit utilizes a portion of the vacuum tube section **50*b* consisting of cathode 53*b*, grid 52*b* and anode 51*d*. An RC network 80 consisting of resistors 81 and 82 and capacitors 83 and 84 is provided between anode 51*d* and ground with the common junction between resistors 81 and 82** being coupled to grid 52*b*. By feeding a positive pulse at the horizontal deflection frequency from horizontal deflection system 22 through coupling capacitor 85 to anode 51*d*, this section conducts proportionately to the level of sync tips applied at cathode 53*b* from video detector 14. A voltage drop therefore developed across the resistors 81 and 82, a portion of which is coupled to grid 52*b* as a derived bias. Since grid 52*b* is also common to the noise inverter, the conduction through tube section 50*b* to anode 51*c* is therefore dependent upon the derived bias by network 80. If the signal applied to cathode 53*b* increases, conduction of tube section 50*b* increases, and the derived bias across the network 80 decreases allowing the grid to follow the cathode. The reverse is the case if the signal increases in strength. Thus, it may be seen that an automatic level setting of the bias is provided for the noise inverter circuit.

Further, it is to be emphasized that the automatic level setting is independent of the automatic gain control reference level. Prior circuits are dependent upon the reference level maintained by the automatic gain control circuit and are therefore limited to the threshold of the automatic gain control action. The present invention provides for noise inversion and cancellation even below the automatic gain control threshold. This action occurs as a result of the direct current coupling of the negative and positive polarity composite video signals to the noise inverter in cooperation with the automatic level set function.

The electron discharge devices for the automatic level setting, noise cancellation, automatic gain control and sync separating circuit may be supplied as four separate units, as dual triode units, with common grids and cathodes, or as a single unit having two triode sections with four split anodes as shown in FIG. 1. The latter is the most economical and provides a high degree of compactness. Further, this arrangement effectively eliminates a substantial number of the conventional components normally required.

In a specific embodiment of the invention, it has been found that the following component types and values provide satisfactory results:

| | |
|---|---|
| Resistor 35, ohms | 33,000 |
| Vacuum tube 50 | (1) |
| Voltage dependent resistor 57 | (2) |
| Resistor 58, ohms | 4,700 |
| Capacitor 63, microfarads | 2.2 |
| Capacitor 64, microfarads | 2.0 |
| Capacitor 65, micromicrofarads | 100 |
| Resistor 66, ohms | 68,000 |
| Capacitor 69, micromicrofarads | 470 |
| Resistor 72, ohms | 1,800 |
| Resistor 81, ohms | 1,000,000 |
| Resistor 82, ohms | 10,000,000 |
| Capacitor 83, microfarads | .01 |
| Capacitor 84, nominal, micromicrofarads | 100 |
| Capacitor 85, micromicrofarads | 100 |

[1] Four plate dual triode.
[2] "Ferroxcube" F249CE or equivalent.

In the arrangement as shown in FIG. 1, composite video signals of positive polarity are direct current coupled to the input of the automatic gain control circuit. By virtue of the common grid 52*a*, direct current coupling is also effected to the sync separating portions of tube section 50*a*. It is commonly known that the output synchronization signals from a single triode direct-current clipper tends to vary with signal strength unless the automatic gain control action has exceptionally high gain. Further, in a common grid/cathode arrangement for a combined automatic control and sync separator circuit, cutoff limiting without grid current limiting results in the clipping of only the "whiter" end of the sync signals. As indicated, a voltage dependent resistor 57 is provided as a plate load for the sync separating circuit and is connected between anode 51*a* and the bootstrap potential source (660 volts). Voltage dependent resistor 57 effectively results in clipping of the "black" end of the sync signal by limiting the maximum amplitude developed at anode 51*a*. This action therefore further improves the stability of the sync output as well as providing a degree of clipping together with a further improvement in the immunity to noise.

SUMMARIZATION

The invention therefore provides an improved automatic gain control (AGC) and synchronization (sync) signal separator circuit for a television receiver which is both immune to impulse noise disturbances by virtue of a noise cancellation circuit and to noise paralyzation by an automatic level setting control which automatically adjusts the bias applied thereto according to the level of strength of the received television signal. Direct current coupling between the output of the video amplifier and the input to the AGC and sync separator circuit permits the utilization of full video information for improved performance. The electron discharge device required for the AGC, sync separator, noise cancellation and automatic level setting circuits may be supplied as four separate units, as dual triode units with common grids and cathodes, or, for optimum compactness and economical considerations, as a single unit with dual triode sections and four split anodes.

What is claimed is:

1. In a television receiver having an amplifier for translating a received television signal modulated by a composite video signal and an automatic gain control system for controlling the gain of the amplifier, the combination of, a video signal detector and translating circuit coupled thereto to provide the composite video signal including synchronizing pulses and noise pulses having amplitudes exceeding the amplitudes of the synchronizing pulses, a synchronizing signal separator circuit connected to said translating circuit, electron valve means for amplitude separating the noise pulses from the composite video signal and applying the same to said synchronizing signal separator circuit with a polarity to cancel the noise pulses therein, means direct current coupling the composite video signal from said video detector to said electron valve means, means direct current coupling said electron valve means to said synchronizing signal separator circuit, a source of timed pulses coincident with the synchronizing pulses coupled to said electron valve means to render the same responsive to the synchronizing pulses, and a resistor-capacitor network connected to said electron valve means to develop a bias therefor in accordance with the amplitude of the synchronizing pulses so that the noise pulses are separated by said electron valve means at a level dependent upon the peak amplitude of the composite video signal, said electron valve means and said resistor-capacitor network being independent of the automatic gain control system so that said bias is independent of the operation of the automatic gain control system.

2. In a television receiver having an amplifier for translating a received television signal modulated by a composite video signal and an automatic gain control system for controlling the gain of the amplifier, the combination of, a video signal detector and translating circuit coupled thereto to provide the composite video signal including synchronizing pulses and noise pulses having amplitudes exceeding the amplitudes of the synchronizing pulses, a synchronizing signal separator circuit connected to said translating circuit, electron valve means for amplitude separating the noise pulses from the composite video signal and applying the same to said synchronizing signal separator circuit with a polarity to cancel the noise pulses therein, said electron valve means having a pair of input electrodes and a pair of output electrodes, means direct current coupling the composite video signal from said video detector to one input electrode, means direct current coupling one output electrode to said synchronizing signal separator circuit, a source of timed pulses coincident with the synchronizing pulses coupled to the other output electrode, and a resistor-capacitor network connected between said other output electrode and the other input electrode to bias said electron valve means in accordance with the amplitude of the synchronizing pulses so that the noise pulses are separated by said electron valve means at a level dependent upon the peak amplitude of the composite video signal, said electron valve means and said resistor-capacitor network being independent of the automatic gain control system so that said bias is independent of the operation of the automatic gain control system.

3. A system for utilizing a composite video signal in a television receiver having an amplifier for a received signal modulated by the video signal and an automatic gain control system for regulating the gain of the amplifier, the combination of, a translating circuit for conducting the composite video signal including synchronizing pulses and noise pulses having amplitudes exceeding the amplitudes of the synchronizing pulses, electron valve means for amplitude separating the noise pulses from the composite video signal and applying the same to said translating circuit with a polarity to cancel the noise pulses therein, direct current coupling means applying the composite video signal to said electron valve means and means coupling said electron valve means to said translating circuit, a source of control potential responsive during the synchronizing pulses, and means independent of the automatic gain control system and including at least a portion of said electron valve means connected to said source and responsive to the control potential for biasing said electron valve means in accordance with the amplitude of the synchronizing pulses so that the noise pulses are separated by said electron valve means at a level dependent upon the amplitude of the composite video signal and independent of the operation of the automatic gain control system.

4. In a television receiver for utilizing a composite video signal including video and synchronizing components and having an amplifier controlled by an automatic gain control system responsive to the level of a received signal above a threshold for maintaining the video signal at a relatively constant level, wherein the signal may be accompanied by noise pulses having amplitudes exceeding the amplitudes of the synchronizing components, the combination of, a synchronizing signal separator including means for applying the composite video signal thereto, means for amplitude separating the noise pulses from the composite video signal including electron valve means coupled to said synchronizing signal separator, means direct current coupling the composite video signal to said electron valve means with a polarity to cause the noise pulses therefrom to be of opposite polarity to the noise pulses in said synchronizing signal separator, and means independent of the automatic gain control system and responsive during the synchronizing components for biasing said electron valve means in accordance with the peak amplitude of the synchronizing pulses so that separation of noise pulses for cancellation purposes is automatically adjusted in accordance with the level of the composite video signal regardless of control of the level thereof by the automatic gain control system.

5. In a television receiver for utilizing a composite video signal including video and synchronizing components, and wherein the signal may be accompanied by noise pulses having amplitudes exceeding the amplitudes of the synchronizing components, the combination of, a synchronizing signal separator and an automatic gain control circuit including means for applying the composite video signal thereto, means for amplitude separating the noise pulses from the composite video signal including electron valve means coupled to said synchronizing signal separator and said automatic gain control circuit, means direct current coupling the composite video signal to said electron valve means with a polarity to cause the noise pulses therefrom to be of opposite polarity to the noise pulses in said synchronizing signal separator and automatic gain control circuit, and means independent of said automatic gain control circuit for biasing said electron valve means in accordance with the peak amplitude of the synchronizing pulses so that separation of noise pulses for cancellation purposes is automatically adjusted in accordance with the level of the composite video signal and independently of whether the level thereof is set by said automatic gain control circuit.

6. In a television receiver having an amplifier for translating a receiving signal modulated by composite video components and an automatic gain control system for controlling the gain of the amplifier to establish a given level of the signal when the same reaches a predetermined threshold level, the combination of a video signal detector coupled to the amplifier and including a detector load, a video amplifier coupled to said detector load and having an output circuit at which appears the composite video component including synchronizing pulses and noise pulses having amplitudes exceeding the amplitudes of the synchronizing pulses, a synchronizing signal separator connected to said video amplifier output circuit, an electron valve for amplitude separating the noise pulses from the video signal component and including cathode, grid and anode electrodes, means connecting said cathode electrode to said detector load so that the noise pulses are applied to said electron valve with a polarity tending to cause conduction of said electron valve, means coupling said anode electrode to said synchronizing signal separator circuit for applying the separated noise pulses thereto with a polarity for cancelling noise pulses applied to said synchronizing signal separator circuit from said video amplifier output circuit, and an automatic biasing circuit direct current connected between said cathode and grid electrodes, said biasing circuit being independent of the automatic gain control system and including means responsive during the occurrence of said synchronizing pulses and responsive to the amplitude of the synchronizing pulses in the received signal as demodulated in said video detector for establishing conduction of said electron valve by noise pulses exceeding the amplitude of the synchronizing pulses and independently of the operation of said automatic gain control system.

7. In a television receiver having an amplifier for translating a received signal modulated by composite video components and a gated automatic gain control system for controlling the gain of the amplifier to establish a given level of the signal when the same reaches a predetermined threshold level, the combination of a video signal detector coupled to the amplifier and including a detector load, a video amplifier direct current to said detector load and having an output circuit at which appears the composite video component including synchronizing pulses and noise pulses having amplitudes exceeding the amplitudes of the synchronizing pulses, a synchronizing signal separator coupled to said video amplifier output circuit, an electron valve for amplitude separating the noise pulses from the video signal component and including input, control and output electrodes, means direct current connecting said input electrode to said detector load so that the noise pulses are applied to said electron valve with a polarity tending to cause conduction of said electron valve, means connecting said output electrode to said synchronizing signal separator circuit for applying the separated noise pulses thereto with a polarity for canceling noise pulses applied to said synchronizing signal separator circuit from said video amplifier output circuit, and an automatic biasing circuit direct current connected between said input and control electrodes, said biasing circuit including capacitor means bypassing said control electrode and being independent of the automatic gain control system, said biasing circuit further including means automatically responsive during the occurrence of said synchronizing pulses and to the amplitude of the synchronizing pulses in the received signal as demodulated in said video detector for establishing a bias of said electron valve to cause conduction thereof by noise pulses exceeding the amplitude of the synchronizing pulses and independently of the operation of said automatic gain control system.

No references cited.

DAVID G. REDINBAUGH, *Primary Examiner.*